(12) United States Patent
Takahashi et al.

(10) Patent No.: US 9,552,084 B2
(45) Date of Patent: Jan. 24, 2017

(54) CONTROL OF AN ELECTRONIC DEVICE EQUIPPED WITH COORDINATE INPUT DEVICE FOR INPUTTING WITH AN ELECTRONIC PEN

(71) Applicant: LENOVO (Singapore) PTE, LTD., New Tech Park (SG)

(72) Inventors: Hiromoto Takahashi, Tokyo (JP); Takenobu Nakao, Tokyo (JP); Takumi Imai, Kamakura (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 43 days.

(21) Appl. No.: 14/464,344

(22) Filed: Aug. 20, 2014

(65) Prior Publication Data

US 2015/0054797 A1    Feb. 26, 2015

(30) Foreign Application Priority Data

Aug. 21, 2013    (JP) .................................. 2013-171612

(51) Int. Cl.
*G06F 3/0354*    (2013.01)
*G06F 3/041*    (2006.01)
(Continued)

(52) U.S. Cl.
CPC ......... *G06F 3/03545* (2013.01); *G06F 1/1677* (2013.01); *G06F 1/3262* (2013.01);
(Continued)

(58) Field of Classification Search
CPC .... G06F 3/03545; G06F 3/044; G06F 3/0416; G06F 3/04883; G06F 3/0488; G06F 3/041; G06F 3/0412; G06F 3/04886; G06F 3/0317; G06F 3/046; G06F 3/04815; G06F 3/0235; G06F 3/0418; G06F 3/042; G06F 3/03547; G06F 3/0421; G06F 3/038; G06F 3/03542; G06F 3/0482; G06F 3/045; G06F 3/017; G06F 3/0386; G06F 3/04842; G06F 3/033; G06F 3/0346; G06F 3/0428; G06F 3/14; G06F 3/011; G06F 3/0383; G06F 3/0202; G06F 2203/04808; G06F 2203/04106; G06F 2203/04104; G06F 2203/04101; G06F 2203/04108; G06F 2203/0384; G06F 2203/04807; G06F 2203/04111; G06F 2203/0381; G06F 1/1626; G06F 1/1643; G06F 1/1684; G06F 1/169; G06F 1/3262; G06F 2200/1632; G06F 21/32
See application file for complete search history.

(56) References Cited

U.S. PATENT DOCUMENTS

2005/0171714 A1* 8/2005 Ely ........................ G06F 1/3203
702/75
2008/0168290 A1* 7/2008 Jobs .......................... G06F 1/26
713/324
(Continued)

FOREIGN PATENT DOCUMENTS

JP    63-070326    3/1988
JP    04-369027    12/1992
(Continued)

OTHER PUBLICATIONS

JP10-124239: English Language Translation of JP10-124239; Author: Hosokawa Mikio; Published May 15, 1998.*

*Primary Examiner* — Nalini Mummalaneni
(74) *Attorney, Agent, or Firm* — Kunzler Law Group (57) ABSTRACT

A manner of reducing the power consumption is utilized in a tablet terminal equipped with a digitizer for inputting with an electronic pen. When another tablet terminal or a smartphone approaches the tablet terminal, each digitizer detects input. When the digitizer detects the input, it is determined whether the input is electronic pen input from the electronic pen or proximity input caused by the proximity of the other tablet terminal or the smartphone. In the case of electronic pen input, coordinate information is transferred to a system, (Continued)

while in the case of proximity input, the system takes an action such as shifting a tablet terminal to a sleep state.

20 Claims, 8 Drawing Sheets (51) Int. Cl.
    *G06F 3/046* (2006.01)
    *G06F 1/16* (2006.01)
    *G06F 1/32* (2006.01)

(52) U.S. Cl.
    CPC ............ *G06F 3/046* (2013.01); *G06F 3/0416* (2013.01); *G06F 2203/04101* (2013.01); *G09G 2330/022* (2013.01)

(56) References Cited

U.S. PATENT DOCUMENTS

| | | | |
|---|---|---|---|
| 2010/0257473 | A1 | 10/2010 | Kang |
| 2011/0050613 | A1* | 3/2011 | Jiang ................... G06F 1/1626 345/173 |
| 2011/0252317 | A1* | 10/2011 | Keranen ............. G06F 3/04883 715/702 |
| 2011/0298726 | A1* | 12/2011 | Wu ....................... G06F 1/1632 345/173 |
| 2012/0032894 | A1* | 2/2012 | Parivar ................. G06F 1/3215 345/173 |
| 2013/0009907 | A1* | 1/2013 | Rosenberg ............. G06F 3/046 345/174 |
| 2013/0222238 | A1* | 8/2013 | Sliger .................. G06F 3/0484 345/157 |
| 2013/0225139 | A1* | 8/2013 | Moran ................ H04M 1/7253 455/415 |
| 2014/0380187 | A1* | 12/2014 | Gardenfors ............ G06F 3/017 715/748 |

FOREIGN PATENT DOCUMENTS

| | | |
|---|---|---|
| JP | 2008123476 | 5/2008 |
| JP | 2009044532 | 2/2009 |
| JP | 2010136102 | 6/2010 |
| JP | 2010204978 | 9/2010 |
| JP | 2012014461 | 1/2012 |

* cited by examiner

CONTROL OF AN ELECTRONIC DEVICE EQUIPPED WITH COORDINATE INPUT DEVICE FOR INPUTTING WITH AN ELECTRONIC PEN

FIELD

The disclosed embodiments relate to techniques for detecting input to a coordinate input device for inputting with an electronic pen, and for detecting input attributed to any factor other than an operation of the electronic pen to control the operation of an electronic device.

BACKGROUND

Electronic devices such as tablet terminals, smartphones, and certain types of laptop personal computers (laptop PC) are equipped with a touch screen as an input unit made up by combining a touch panel and a display. Since control of the screen is operated with a finger, the touch screen can be operated more easily and intuitively than the case where a mouse cursor is operated using a mouse or a track point.

Although these electronic devices are generally equipped with a single touch screen, dual screen computers equipped with two touch screens are beginning to appear. There is also a digitizer display made up by combining a digitizer and a display as an input unit for a computer. Since the screen of the digitizer display is operated with an electronic pen, it is convenient to point out a small object. When the digitizer is embedded in the touch screen, since the input method of either a finger or an electronic pen can be selected depending on the work, the operability is improved.

SUMMARY

A first aspect of the disclosed embodiments is implemented in an electronic device equipped with a coordinate input device for inputting with an electronic pen. A reference pattern for determining the type of input is prepared, and when input coordinates to the coordinate input device are detected, the reference pattern and the input coordinates are compared. When it is determined that the input of the input coordinates is generated by an operation of the electronic pen, coordinate information is transferred to a system, while when it is determined that the input is generated by a cause other than the operation of the electronic pen, a control event is transferred to the system.

The cause other than the operation of the electronic pen is caused by the proximity of an object that emits an electromagnetic wave actively or passively. Specifically, it is a case where another electronic device equipped with a coordinate input device emitting an electromagnetic wave approaches the electronic device, or a case where a coil passively emitting an electromagnetic wave approaches the electronic device. The electronic device can be a tablet terminal or a smartphone. The electronic device can be a dual screen computer coupled with another electronic device equipped with a coordinate input device openably/closably, or openably/closably and attachably/detachably.

The coordinate input device can be an electromagnetic induction-type digitizer that operates in a transmission mode and a reception mode. The digitizer may be combined with a display to form a touch screen. The reference pattern can be a pattern of temporal and spatial generation of the detected coordinates. The reference pattern may include pen pressure information on the detected coordinates. The reference pattern can be either a pattern generated by an operation of the electronic pen or a pattern generated by a cause other than the operation of the electronic pen.

When an electromagnetic wave generated by a cause other than the operation of the electronic pen is detected, the electronic device can determine a given coordinate domain in which input is generated, though the detected coordinate information does not reflect a user's intention. Therefore, if the user selects a coordinate domain in which proximity input is generated, the electronic device can generate a different control event based on the coordinate domain determined. The control event can be an event for shifting the electronic device to a sleep state, performing data synchronization with another electronic device, or transferring data to another electronic device.

A second aspect of the disclosed embodiments is implemented in a computer system configured to include a first coordinate input device for inputting with an electronic pen, and a second coordinate input device for inputting with an electronic pen and allowing the first coordinate input device to approach. A reference pattern for determining the type of input is prepared, and input coordinates to the first coordinate input device or the second coordinate input device are detected. When it is determined that the input of the input coordinates is generated by an operation of the electronic pen, coordinate information is transferred to the system. When it is determined that the input of the input coordinates is generated by a cause other than the operation of the electronic pen, a control event is transferred to the system.

The computer system can be a dual screen computer in which a tablet terminal equipped with a first coordinate input device and a tablet terminal equipped with a second coordinate input device are coupled openably/closably, or openably/closably and attachably/detachably. In this case, the operation of the computer system can be stopped according to a control event generated when being closed.

A third aspect of the disclosed embodiments is implemented in an electronic device equipped with a second coordinate input device for inputting with an electronic pen and allowing a first coordinate input device for inputting with an electronic pen to approach. A reference pattern for determining the type of input is prepared, and input coordinates to the second coordinate input device are detected. When it is determined that the input of the input coordinates is generated by an operation of the electronic pen, coordinate information is transferred to a system, while when it is determined that the input of the input coordinates is generated by the proximity of the first coordinate input device, a control event is transferred to the system.

A first coordinate domain and a second coordinate domain can be defined for the second coordinate input device to determine in which of the first coordinate domain and the second coordinate domain the input coordinates are generated. In this case, when it is determined that the input of the input coordinates is generated in the first coordinate domain, a first control event can be transferred, while when it is determined that the input of the input coordinates is generated in the second coordinate domain, a second control event can be transferred. The electronic device shifted to a power-saving state can detect the proximity of the first coordinate input device to the second coordinate input device so as to wake up. The first coordinate input device can be mounted in a smartphone. The disclosed embodiments can also be implemented as a method of reducing the power consumption of an electronic device equipped with a coordinate input device for inputting with an electronic pen, preventing erroneous input, or transferring data.

According to the disclosed embodiments, there can be provided a method of controlling the operation of an electronic device equipped with a coordinate input device for inputting with an electronic pen. According to the disclosed embodiments, there can also be provided a method of reducing the power consumption of an electronic device equipped with a coordinate input device for inputting with an electronic pen. According to the disclosed embodiments, there can further be provided a method of preventing erroneous input of an electronic device equipped with a coordinate input device for inputting with an electronic pen. Further, according to the disclosed embodiments, there can be provided a method of synchronize or transfer data between an electronic device equipped with a coordinate input device for inputting with an electronic pen and another electronic device. Further, according to the disclosed embodiments, there can be provided a computer program and an electronic device for implementing such a method.

BRIEF DESCRIPTION OF THE DRAWINGS

In order that the advantages of the application will be readily understood, a more particular description of the application briefly described above will be rendered by reference to specific embodiments that are illustrated in the appended drawings. Understanding that these drawings depict only typical embodiments of the application and are not therefore to be considered to be limiting of its scope, the application will be described and explained with additional specificity and detail through the use of the accompanying drawings, in which.

DETAILED DESCRIPTION

In this specification, an input display device made up by combining a display and a digitizer to input only with an electronic pen, and an input display device made up by combining a display, a digitizer, and a touch panel to enable input both with a finger and an electronic pen are simply called touch screens unless otherwise particularly noted. Like a laptop PC called a so-called a clamshell type, a certain type of dual screen computer is so configured that two tablet terminals, each with a touch screen mounted thereon, are coupled openably/closably with hinges.

Another type of dual screen computer is so configured that one tablet terminal is attached to the other tablet terminal as a base openably/closably and attachably/detachably. In this case, a touch screen mounted on the attached/detached tablet terminal may be of a different type from that of a touch screen mounted on the tablet terminal as the base. Like the laptop PC, the dual screen computer is also put into a state of closing the two tablet terminals to make it convenient for a user to carry around or store when not in use.

At this time, a magnet type or mechanical type of lid sensor can be operated without performing a special operation in the case of a laptop PC to shift the system to a sleep state. In the case of a single tablet terminal, when a screen is covered with a cover, sensor magnets embedded in the cover and a main body generate a sleep event to shift the system to the sleep state. However, in the case of a dual screen computer, such a cover cannot be attached.

Further, a sensor magnet may not be mounted in the tablet terminal from the standpoint of the space and the cost. In a detachable dual screen computer, various types of tablet terminals may be attached. When a sensor magnet is mounted in the tablet terminal as the base, the mounting position of the sensor magnet in each tablet terminal to be attached to the base is fixed, and this limits the degree of freedom of the design. Further, in the detachable dual screen computer, a tablet terminal with no sensor magnet mounted therein may be attached.

A housing may be closed in a manner such that two touch screens face each other when a dual screen computer is running. In the case of an electromagnetic induction-type digitizer as shown in Patent Document 1, electromagnetic waves emitted from each other interfere with each other, resulting in pseudo input to each other's tablet terminals. For example, if one tablet terminal is displaying an icon on a home screen and the other tablet terminal is displaying a software keyboard, a state similar to a touch on the icon at random or key input may occur, and this may cause the runaway of the system.

Figure 1A:
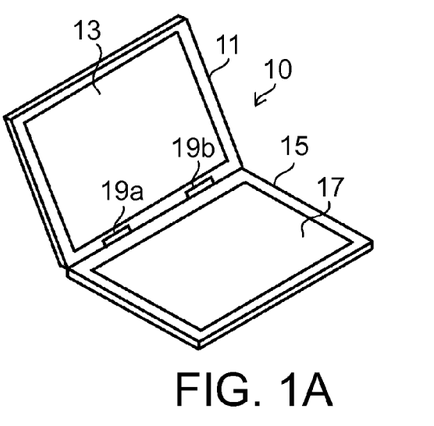
FIG. 1A-1C are perspective views illustrating one aspect of a computer system that configures a dual digitizer system.
Figure 1B:
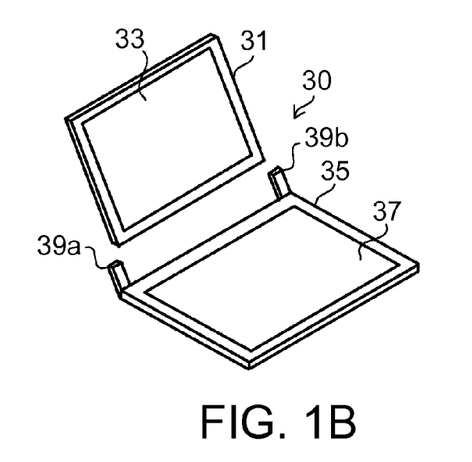
Figure 1C:
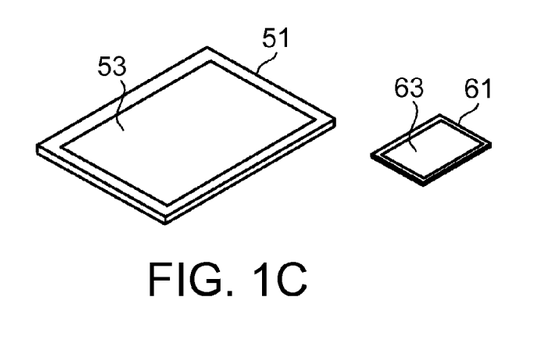

FIG. 1 is a diagram illustrating one aspect of a computer system that configures a dual digitizer system. The dual digitizer system is a computer system configured to include two digitizers that potentially approach each other. Each digitizer may be a component of a touch screen. FIG. 1A shows an example in which the dual digitizer system is realized by an integrated-type dual screen computer 10.

The dual screen computer 10 is so configured that a display-side housing 11 with a touch screen 13 mounted thereon and a base-side housing 15 with a touch screen 17 mounted thereon are coupled openably/closably with hinges 19a and 19b. The dual screen computer 10 displays a software keyboard on the touch screen 17 and an icon or an application screen on the touch screen 13 so that it can be used like a laptop PC.

The dual screen computer 10 is also configured such that, when the display-side housing 11 is opened to 180 degrees, screens displayed on the touch screen 13 and the touch screen 17 can be used as one screen and operated with a finger or an electronic pen. FIG. 1B shows an example in which the dual digitizer system is realized by a detachable dual screen computer 30.

The dual screen computer 30 is so configured that a tablet terminal 35 with a touch screen 37 mounted thereon and a tablet terminal 31 with a touch screen 33 mounted thereon will be coupled attachably/detachably with attaching/detaching mechanisms 39a and 39b. The tablet terminal 31 and the tablet terminal 35 are connected through a cable or radio interface when they are coupled. In a separated state, the tablet terminal 31 and the tablet terminal 35 function as tablet terminals, respectively, while in a coupled state, the tablet terminal 31 and the tablet terminal 35 cooperate with each other to configure an integrated computer system. Tablet terminals from various manufacturers and of various types can be attached to the attaching/detaching mechanisms 39a and 39b. Further, the touch screen 33 and the touch screen 37 can be closed to face each other in the coupled state in order to make it convenient for a user to carry around or store.

FIG. 1C shows an example in which the dual digitizer system is realized by a tablet terminal 51 with a touch screen 53 mounted thereon and a smartphone 61 with a touch screen 63 mounted thereon. The tablet terminal 51 and the smartphone 61 operate independently of each other individually, and when approaching each other to overlap the touch screen 53 and the touch screen 63, the tablet terminal 51 and the smartphone 61 configure the dual digitizer system to perform a unique operation.

Figure 2:
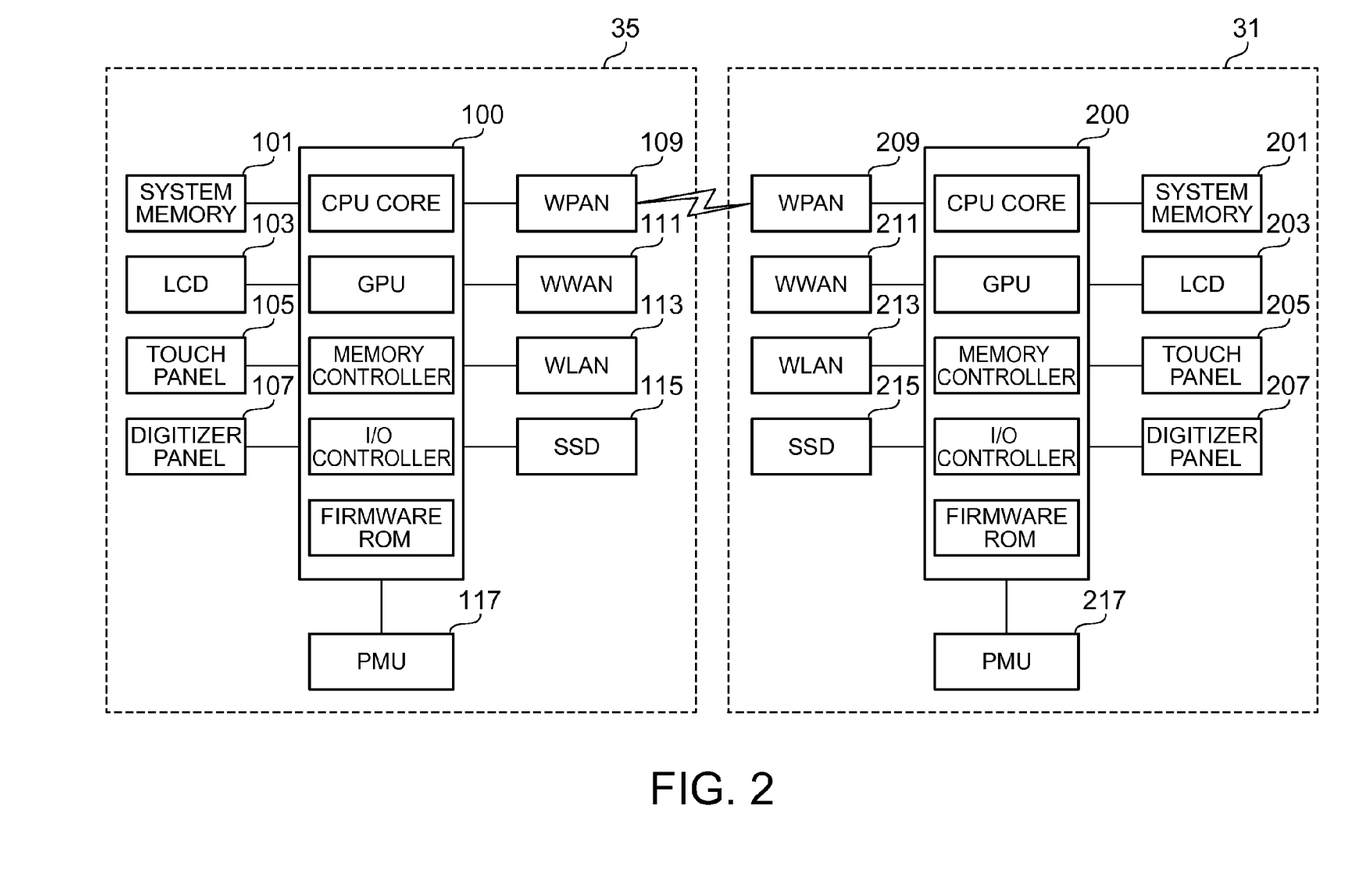
FIG. 2 is a functional block diagram illustrating an example of the configuration of a dual screen computer.

FIG. 2 is a functional block diagram illustrating an example of the configuration of the dual screen computer 30 shown in FIG. 1B. Although the configurations of the tablet terminals 35 and 31 may be different, the description will be made as the same configuration here. Each of the tablet terminals 35 and 31 is so configured that a system memory 101, 201, an LCD 103, 203, a touch panel 105, 205, a digitizer panel 107, 207, a WPAN (Wireless Personal Area Network) module 109, 209, a WWAN (Wireless Wide Area Network) module 111, 211, a WLAN (Wireless Local Area Network) module 113, 213, an SSD 115, 215, and a power management unit (PMU) 117, 217 are connected to an SOC (System on a chip) type embedded system (Embedded System) 100, 200, respectively.

Each of the embedded systems 100 and 200 is composed of a CPU core, a GPU, a memory controller, an I/O controller, a firmware ROM, and the like. The SSD 115, 215 stores software such as application programs executed by each CPU core, an operating system, and device drivers. In one example, the embedded system 100 and the embedded system 200 are connected to each other through the WPAN modules 109 and 209 when the tablet terminals 35 and 31 are connected to configure an integrated computer system.

Each of the WPAN modules 109 and 209 is a device for performing radio communication in any standard such as Bluetooth (registered trademark), infrared communication, or NFC communication (Near Field Communication). The embedded system 100 and the embedded system 200 may be connected through a cable interface such as USB at the time of being coupled. Items necessary to apply the disclosed embodiments in the configuration of the dual screen computer 10 in FIG. 1A, and the configuration of the tablet terminal 51 and the smartphone 61 in FIG. 1C can be understood from the configuration of FIG. 2.

Figure 3A:
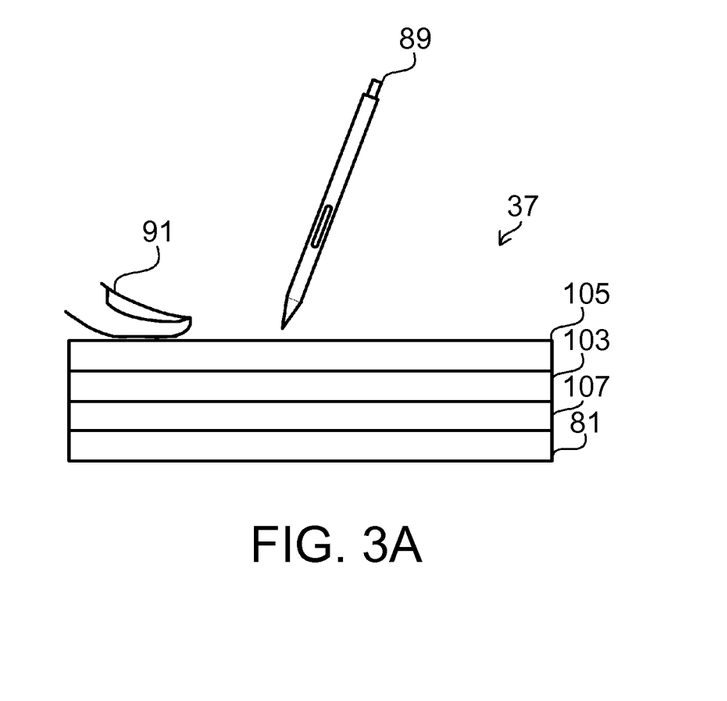
FIGS. 3A and 3B are perspective views illustrating the structures of touch screens 37 and 33.
Figure 3B:
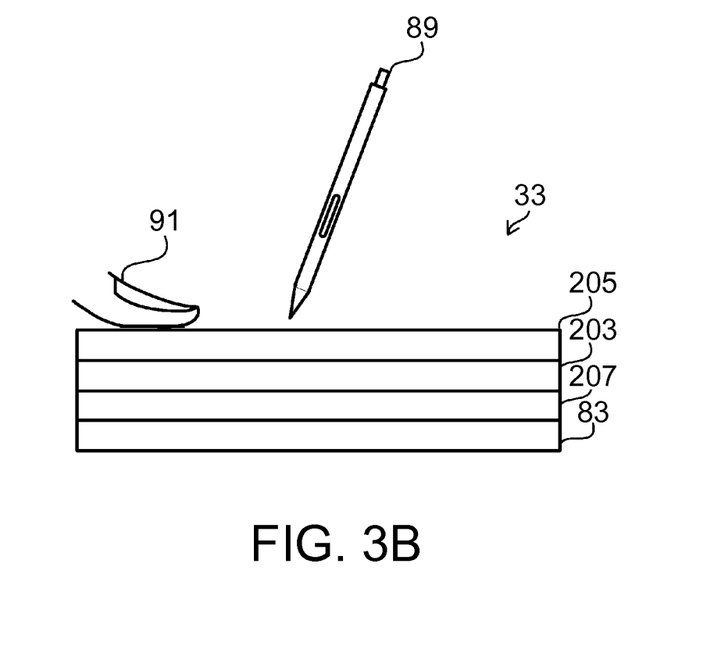

FIG. 3A is a sectional view for describing the structure of the touch screen 37 mounted on the tablet terminal 35, and FIG. 3B is a sectional view for describing the structure of the touch screen 33 mounted on the tablet terminal 31. Each of the touch screens 37 and 33 has such a structure that the touch panel 105, 205, the LCD 103, 203, the digitizer panel 107, 207, and a shield panel 81, 83 are laminated from the top to detect the proximity of a finger 91 in order to cause the touch panel 105, 205 to generate coordinate information, and to detect the proximity or a pressing force of an electronic pen 89 in order to cause the digitizer panel 107, 207 to generate coordinate information.

Figure 4:
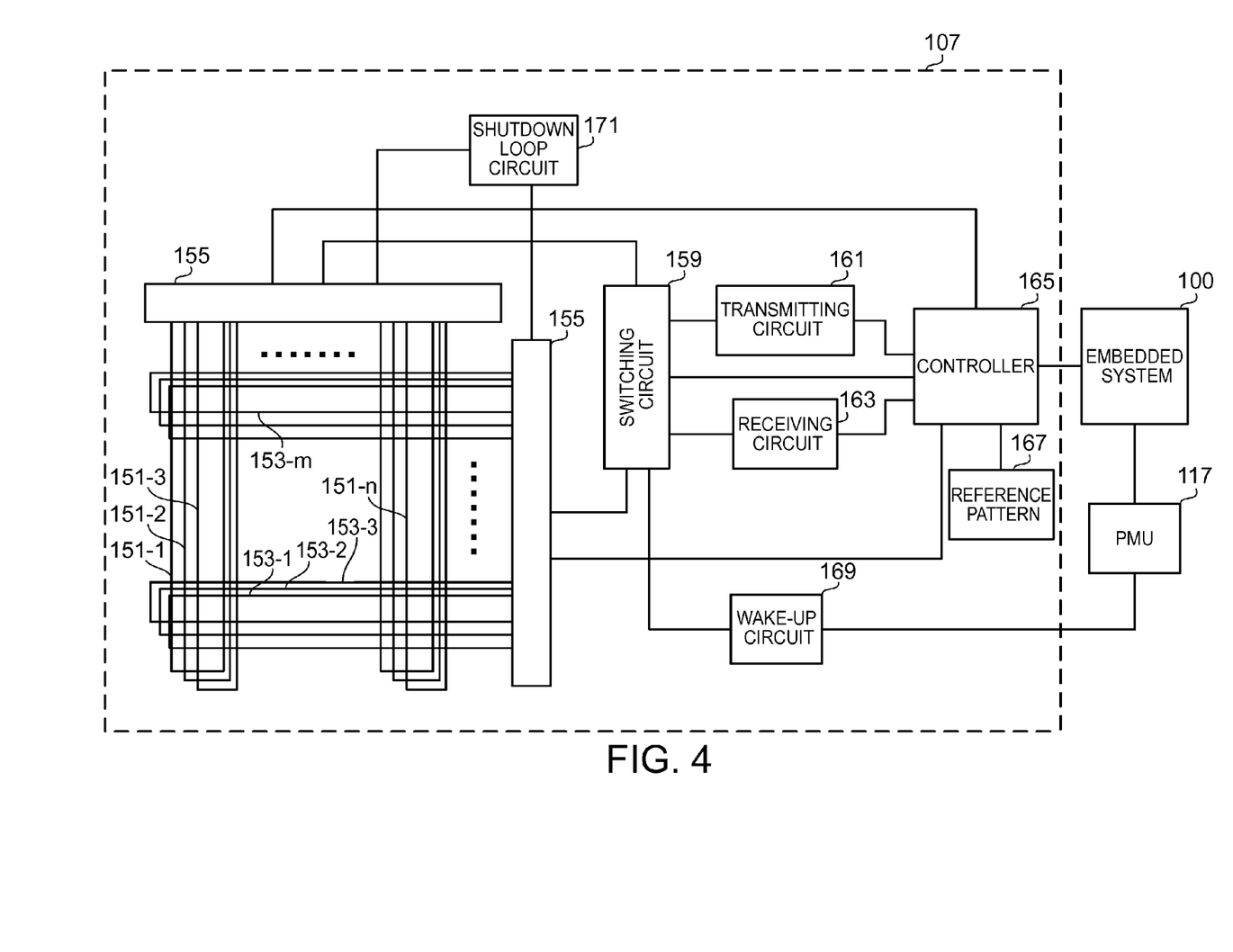
FIG. 4 is a functional block diagram illustrating an example of the configuration of a digitizer panel 107.
Figure 5:
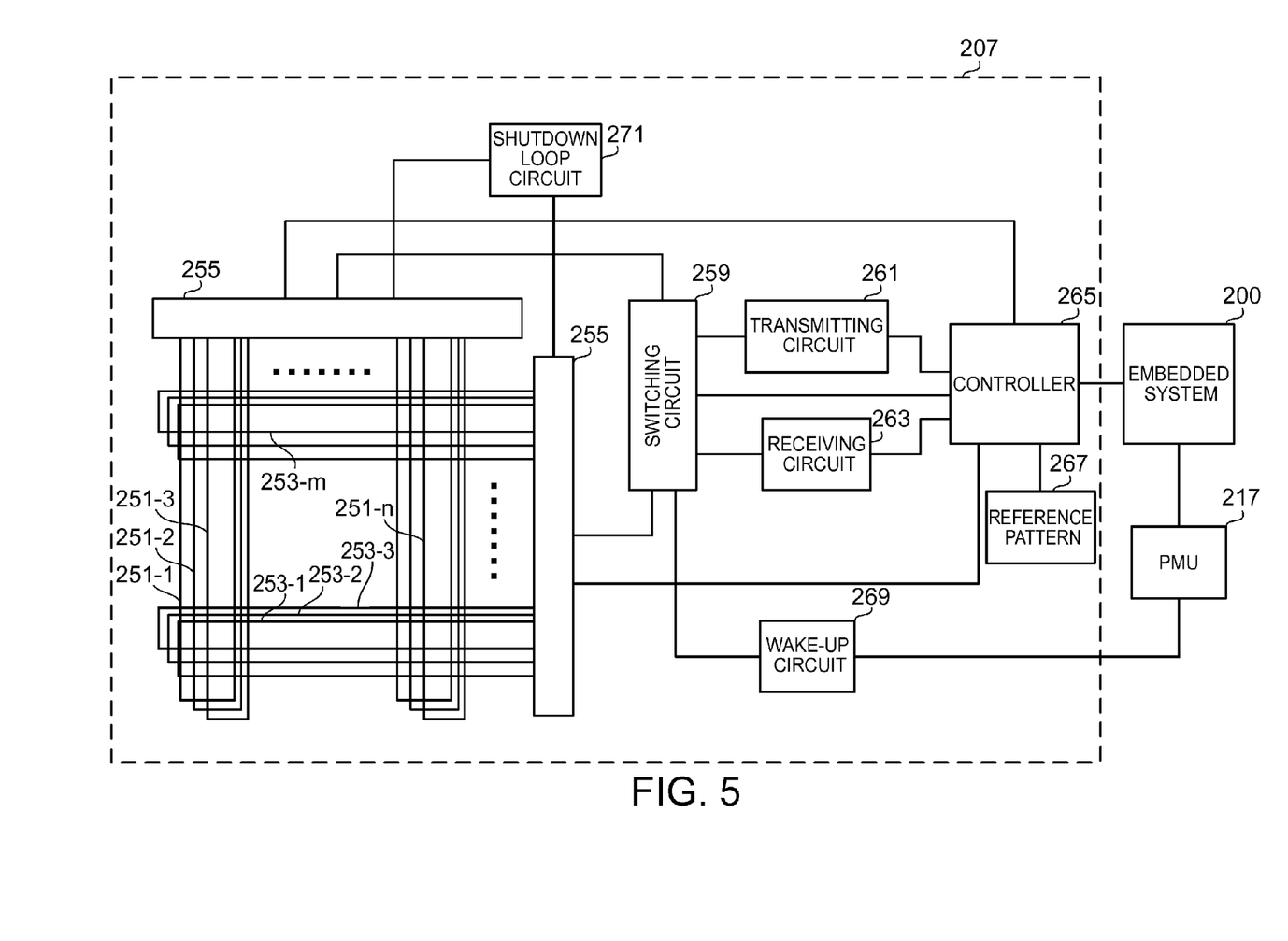
FIG. 5 is a functional block diagram illustrating an example of the configuration of a digitizer panel 207.

FIG. 4 is a functional block diagram illustrating an example of the configuration of the digitizer panel 107, and FIG. 5 is a functional block diagram illustrating an example of the configuration of the digitizer panel 207. Each of the digitizer panels 107 and 207 has a transmission mode and a reception mode, and includes sensor coils 151-1 to 153-$m$, 251-1 to 253-$m$ using electromagnetic wave interference with the electronic pen 89 of the type that does not require the supply of power. The electronic pen 89 includes an L-C resonant circuit formed of a coil and a capacitor. The operations of the electronic pen 89 include an up operation, a down operation, and a pen pressure operation.

The up operation is an operation for placing the electronic pen 89 in a position where the digitizer panel 107, 207 cannot detect input due to the electromagnetic wave interference, the down operation is an operation for placing the electronic pen 89 in a detectable position, and the pen pressure operation is an operation for pressing the tip of the electronic pen 89 against the surface of the touch screen 37, 33. The resonant circuit of the electronic pen 89 includes a variable capacitor the capacitance of which varies depending on the magnitude of the pressure when the pen tip is pressed against the surface of the touch screen 37, 33 so that information corresponding to pen pressure upon drawing on paper with a pen can be detected according to a change in phase difference between excitation current in the transmission mode and induced voltage in the reception mode.

In coil arrays 150, 250, n sensor coils 151-1 to 151-$n$, 251-1 to 251-$n$ are arranged with equal pitches to overlap one another in order in the X-axis direction, and m sensor coils 153-1 to 153-$m$, 253-1 to 253-$m$ are arranged with equal pitches to overlap one another in order in the Y-axis direction. Based on a selection signal received from each of controllers 165 and 265, each of selection circuits 155, 255 selects the sensor coils 151-1 to 153-$m$, 251-1 to 253-$m$ one by one in order to form a loop circuit that goes through each of transmitting circuits 161, 261 or each of receiving circuits 261, 263 via each of switching circuits 159, 259. In response to a switching signal received from the controller 165, 265, the switching circuit 159, 259 switches the loop circuit between the transmitting circuit 161, 261 and the receiving circuit 163, 263 alternately at predetermined time intervals multiple times while a predetermined sensor coil is being selected by the selection signal.

Operation during a period of selecting the transmitting circuit 161, 261 by the switching signal is called the transmission mode (transmission period), and operation during a period of selecting the receiving circuit 163, 263 is called the reception mode (reception period). The controller 165, 265 (a device driver therefor in practice) generates the switching signal to form multiple transmission periods and reception periods during the selection of one sensor coil. The transmitting circuit 161, 261 supplies high-frequency excitation current to the selected sensor coil during each transmission period. The sensor coil through which the excitation current flows emits an electromagnetic wave. The coil of the electronic pen 89 for which the down operation or the pen pressure operation is performed resonates with the electromagnetic wave and hence current flows through the resonant circuit.

The current flowing through the resonant circuit causes an electromagnetic wave to be emitted from the coil of the electronic pen 89. The electromagnetic wave emitted from the coil of the electronic pen 89 is received by the same sensor coil during each reception period following the transmission period. The receiving circuit 163, 263 converts, to digital data, the induced voltage across the sensor coil detected during the reception period, and sends the digital data to the controller 165, 265. Since the induced voltage becomes larger as the distance between the sensor coil and the electronic pen 89 is shorter, the controller 165, 265 can detect the induced voltage across each sensor coil selected in order while the electronic pen 89 is positioned on certain coordinates to identify a sensor coil present in a position closest to the electronic pen 89 in order to generate coordinate information.

The controller 165, 265 generates the switching signal and the selection signal, and generates the coordinate information from the induced voltage across the sensor coil. When the pen pressure operation is performed to press the electronic pen 89 against the surface of the touch screen 33, 37, the capacitance of the variable capacitor of the electronic pen 89 varies to change the frequency of the current flowing through the resonant circuit. The controller 165, 265 calculates a difference between the frequency of the excitation current transmitted during the transmission period and the frequency of the induced voltage detected during the reception period to generate pen pressure information on the electronic pen 89.

The controller 165, 265 sends the coordinate information and the pen pressure information to the embedded system 100, 200. The pen pressure information takes a larger value as the force to depress the electronic pen 89 (pen pressure) is greater. A drawing application in the system performs processing for making a drawn line thicker as the pen pressure information exhibits a larger value. The ROM 167, 267 stores a reference pattern used to determine which of electronic pen input and proximity input to be described below the input pattern identified from the coordinate information and the pen pressure information is. Note that each wake-up circuit 169, 269 and each shutdown loop circuit 171, 271 that can be provided as needed to cope with a specific problem associated with the disclosed embodiments will be described later.

When an object displayed on the touch screen 37, 33 is pointed out using the electronic pen 89, input to the software keyboard is performed, or input to a screen of the drawing application is performed, and the controller 165, 265 generates a corresponding coordinate signal and pen pressure information. Then, the controller 165, 265 processes induced voltage across all the sensor coils as input. However, the electromagnetic waves that generate the induced voltage across the sensor coils are not always emitted only from the electronic pen 89.

If the housing of the tablet terminal 31 and the housing of the tablet terminal 35 are closed to make the touch screen 33 and the touch screen 37 face each other, the mutual distance between the sensor coils 151-1 to 153-$m$ and the sensor coils 251-1 to 253-$m$ will become short. The controller 165, 265 generates the selection signal and the switching signal mutually asynchronous with each other to form transmission periods and reception periods. For example, when the selected sensor coil 251-1 of the tablet terminal 31 is in a transmission period, if the selected sensor coil 151-1 of the tablet terminal 35 present in a position opposite to the tablet terminal 31 is in a reception period, induced voltage will be generated across the sensor coil 151-1 by an electromagnetic wave emitted from the sensor coil 251-1.

If the receiving circuit 163 detects effective induced voltage, the controller 165 of the tablet terminal 35 will generate the coordinate information and the pen pressure information without fail. When the transmission period and the reception period of the tablet terminals 31 and 35 are reversed, the controller 265 of the tablet terminal 31 generates the coordinate information and the pen pressure information in the same way. The coordinate information and the pen pressure information generated by the controller 165, 265 when the touch screens 33 and 37 approach each other produce a pattern different from the coordinate information when a user performs input with the electronic pen 89. Hereinafter, a state where the electronic pen 89 is operated to perform input is called electronic pen input, and a state where the touch screens 33 and 37 approach each other to perform pseudo input is called proximity input.

For example, when input to multiple coordinates at short time intervals that make it difficult for a person to perform electronic pen input is detected, the controller 165, 265 can determine the input to be proximity input. Further, in the case of drawing with the electronic pen 89, the user can draw a line continuously at the maximum pen pressure recognizable by the controller 165, 265, but the user rarely draws points or lines in discrete positions at the maximum pen pressure.

When input at the maximum pen pressure is generated on discrete coordinates, the controller 165, 265 can determine the input to be proximity input. Further, when input is continuously performed on two coordinates with one electronic pen 89, the down operation and up operation for the previous coordinates are followed by the down operation for the next coordinates. When the down operations performed on multiple coordinates are detected at the same time, the controller 165, 264 can determine the input to be proximity input.

Input patterns can be classified into a pattern generated by proximity input alone, a pattern generated by electronic pen input alone, and a pattern generated by both. The input pattern generated by proximity input alone or the input pattern generated by electronic pen input alone is called a reference pattern. It is easier to create the input pattern generated by proximity input alone than the input pattern generated by electronic pen input alone. The ROM 165, 265 stores either or both of reference patterns. When receiving multiple pieces of digital data from the receiving circuit 163, 263, the controller 165, 265 compares input patterns identified from temporal and spatial generation status of coordinate information and pen pressure information with the reference pattern(s) to determine whether this input is electronic pen input or proximity input.

When determining the input to be electronic pen input or not to be proximity input, the controller 165, 265 sends the coordinate information and the pen pressure information to the embedded system 100, 200. When determining the input to be proximity input or not to be electronic pen input, the controller 165, 265 sends the embedded system 100, 200 a control event instead of the coordinate information and the pen pressure information. The control event can be sent using an interface between the controller 165, 265 and the embedded system 100, 200 or using a sideband. When receiving the control event, the embedded system 100, 200 can perform various kinds of control to be described later.

Note that FIG. 1 to FIG. 5 describes the configuration and the connection relation of the main hardware related to the embodiment simplistically to describe the embodiment. A case where multiple blocks described in the drawings are set in one integrated circuit or device, or reversely, where one block is divided to configure multiple integrated circuits or devices will be encompassed in the scope of the disclosed embodiments as long as those skilled in the art can select it arbitrarily. Further, the forms in which the components illustrated in FIG. 1 to FIG. 5 are changed for other components or known components are added will be encompassed in the scope of the disclosed embodiments as long as those skilled in the art can easily appreciate the forms.

Figure 6:
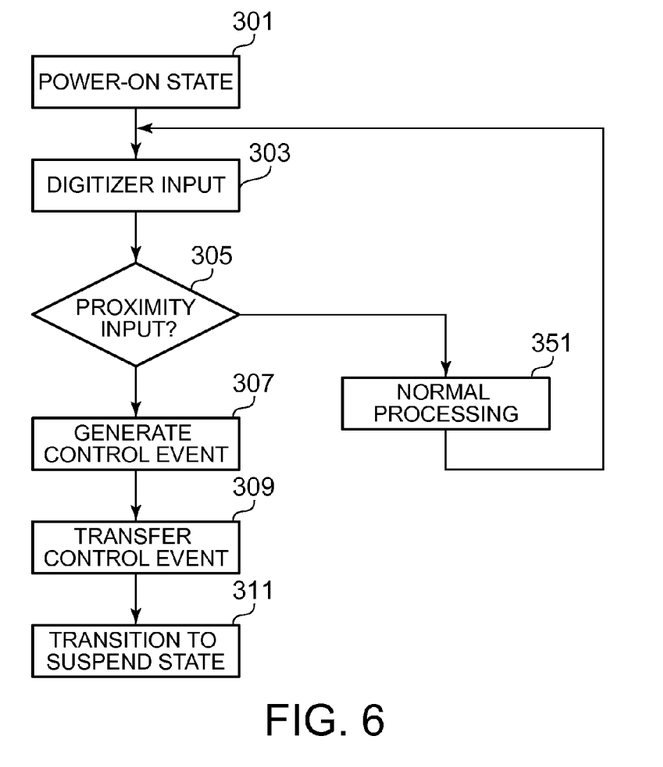
FIG. 6 is a flowchart diagram illustrating an operation procedure when the dual screen computer 30 is closed.

FIG. 6 is a flowchart for describing an operation procedure when the dual screen computer 30 is closed. In block 301, the tablet terminal 31, 35 becomes a power-on state, and the digitizer panel 107, 207 operates while repeating the transmission mode and the reception mode alternately regardless of the presence or absence of input from the electronic pen 89. In block 303, induced voltage is generated in the sensor coils 151-1 to 153-$m$, 251-1 to 253-$m$ for some reason. The controller 165, 265 receives, from the receiving circuit 163, 263, digital data having a size corresponding to the induced voltage generated in the sensor coils.

The controller 165, 265 generates coordinate information and pen pressure information independently of each other. In block 305, the controller 165, 265 identifies an input pattern from the coordinate information and the pen pressure information, and compares the input pattern with a reference pattern stored in the ROM 167, 267. When determining the input to be electronic pen input or not to be proximity input, the controller 165, 265 proceeds to block 351 to send the coordinate information and the pen pressure information to the embedded system 100, 200. An application program in the embedded system 100, 200 processes the received coordinate information and pen pressure information, and the procedure returns to block 303.

When determining the input to be proximity input or not to be electronic pen input, the controller 165, 265 does not send coordinate information and pen pressure information to the embedded system 100, 200. When one of the controller 165 and the controller 265 determines the input to be proximity input ahead of the other, the one controller 165, 265 that has made the determination in block 307 ahead of the other generates a control event and sends the control event to a corresponding one of the embedded systems 100 and 200. The one embedded system 100, 200 that has received the control event sends a message indicative of the control event to the other embedded system 100, 200 via the WPAN module 109, 209 in block 309. In block 311, the embedded systems 100 and 200 process the control event and make a transition to the sleep state, respectively. Specifically, the embedded systems 100 and 200 instruct the PMUs 117 and 217 to suspend power supplied to predetermined devices.

In blocks 305 to 311, when either of the controllers 165 and 265 detects proximity input, the one sends a proximity event to the other and both make a transition to the sleep state, but both of the controllers 165 and 265 may detect proximity input, exchange a message indicative of the control event with each other, and make a transition to the sleep state. In this case, the probability of an erroneous determination between electronic pen input and proximity input can be reduced.

Since the controllers 165 and 265 operate asynchronously with each other, the time until some input is determined to be proximity input in block 305 depends on the hardware configuration and operation timing of the digitizer panel 107, 207. When the search coils that face each other when approaching each other are selected at the same timing, if one operates to become a reception period when the other is in a transmission period, the occurrence of proximity input can be determined in the shortest time.

When the hardware configurations of the digitizer panels 107 and 207 are the same, the time required for the determination may become longer. For example, when the timings of the transmission period and the reception period of both completely match each other, a certain amount of time until one becomes the transmission period and the other becomes the reception period so that both can detect electromagnetic waves from each other is spent due to jitter of an oscillator in each of the transmitting circuits 161 and 261.

Further, if one starts selecting a search coil in the X-axis direction and the other starts selecting a search coil in the Y-axis direction when approaching each other, a certain amount of time until both can detect electromagnetic waves from each other will also be spent.

Although the detection time may be subjected to chance factors and hence made longer, the controllers 165 and 265 can detect proximity input without fail after a certain amount of time has elapsed. When the frequency for selecting a search coil, the frequency for switching between the transmission period and the reception period, and the number of search coils are different, proximity input can be determined in a relatively short time. When proximity input is determined in block 305, since the embedded systems 100 and 200 do not receive coordinate information and pen pressure information, any erroneous operation of the system due to proximity input can be prevented. Note that the control event can be processed by a utility program installed on the tablet terminals 31 and 35, respectively.

There is a case where either of the tablet terminals 31 and 35 makes a transition to the sleep state when the touch screens 33 and 37 approach each other, and hence power supplied to the digitizer panel 107, 207 is suspended. For example, when the power supplied to the digitizer panel 107 of the tablet terminal 35 is suspended, since electromagnetic wave interference does not occur between the digitizer panels 107 and 207 even if the housings are closed, proximity input cannot be detected by the method described above.

The shutdown loop circuits 171 and 271 deal with this problem. Each of the shutdown loop circuits 171 and 271 is configured to short-circuit all sensor coils to form a loop circuit when power supplied to the digitizer panel 107, 207 is suspended. A resonant element may be inserted in each of the shutdown loop circuits 171 and 271 as needed. In this case, for example, even when the tablet terminal 35 is shifted to the sleep state, electromagnetic waves emitted from the sensor coils 251-1 to 253-$m$ of the digitizer panel 207 during each transmission period causes excitation current to flow through the sensor coils 151-1 to 153-$m$ of the digitizer panel 107 to emit an electromagnetic wave so that the digitizer panel 207 can detect the electromagnetic wave during each reception period to detect proximity input.

In the sleep state, there is a method of suspending the power supply to many peripheral devices, including the digitizer panels 107 and 207, when the CPU utilization drops down to cause the CPU cores to make a transition between an active state (C0 state) and a sleep state (C1 state to Cn state) at fixed intervals. As an example, such a method is realized by a function called Connected Standby on Windows (registered trademark) 8.

In the case of Connected Standby, the shutdown loop circuits 171 and 271 mentioned above are provided in the digitizer panels 107 and 207. Suppose that the housings are closed when both are in the Connected Standby mode. In this case, if the digitizer panels 107 and 207 are configured to be supplied with power when the CPU core in one of the tablet terminals 35 and 33 makes a transition to the active state, the one tablet terminal, e.g., the tablet terminal 35, which made the transition to the active state, can detect proximity input, and the other tablet terminal, i.e., the tablet terminal 31 that makes a transition to the active state after that can detect proximity input.

Next, a method of synchronizing and transferring data in a dual digitizer system configured to include the tablet terminal 51 and the smartphone 61 shown in FIG. 1C will be described. The description will be made by associating the configuration of the tablet terminal 51 with that of the tablet terminal 35 in FIG. 2, and associating the configuration of the smartphone 61 with that of the tablet terminal 31 in FIG. 2. It is assumed here that the tablet terminal 51 is shifted to the sleep state in which power supplied to most devices, including the digitizer panel 107, except a device for maintaining the storage of the system memory 101 is suspended like the suspend state. At this time, the smartphone 61 in which the digitizer panel 207 is operating is so overlapped that the touch screen 63 will face the touch screen 53.

If the digitizer panel 107 of the tablet terminal 51 is equipped with the shutdown loop circuit 171, the smartphone 61 can detect a proximity event. However, the tablet terminal 51 cannot detect proximity input unless a wake event is given from the outside to come into the power-on state. The wake-up circuit 169 (the same applies to the wake-up circuit 269) wakes up the tablet terminal 51 in the suspend state by the proximity of the smartphone 61 to deal with this problem.

The wake-up circuit 169 is supplied with power even in the suspend state to detect voltage induced by an electromagnetic wave emitted from the digitizer panel 207 of the smartphone 61 to each of the sensor coils 151-1 to 153-$m$ that form the shutdown loop circuit 171. The wake-up circuit 169 generates a wake event when detecting predetermined voltage across multiple sensor coils, and sends the wake event to the PMU 117. The PMU 117 that has received the wake event supplies power to the embedded system 100 and peripheral devices to shift the system to the power-on state.

Figure 7:
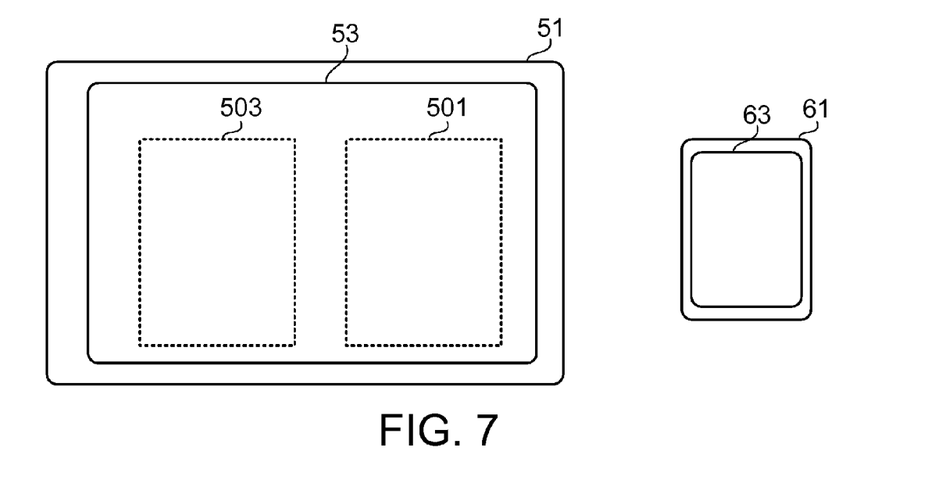
FIG. 7 is a block diagram illustrating a state of synchronizing or transferring data between a tablet terminal 51 and a smartphone 61.
Figure 8:
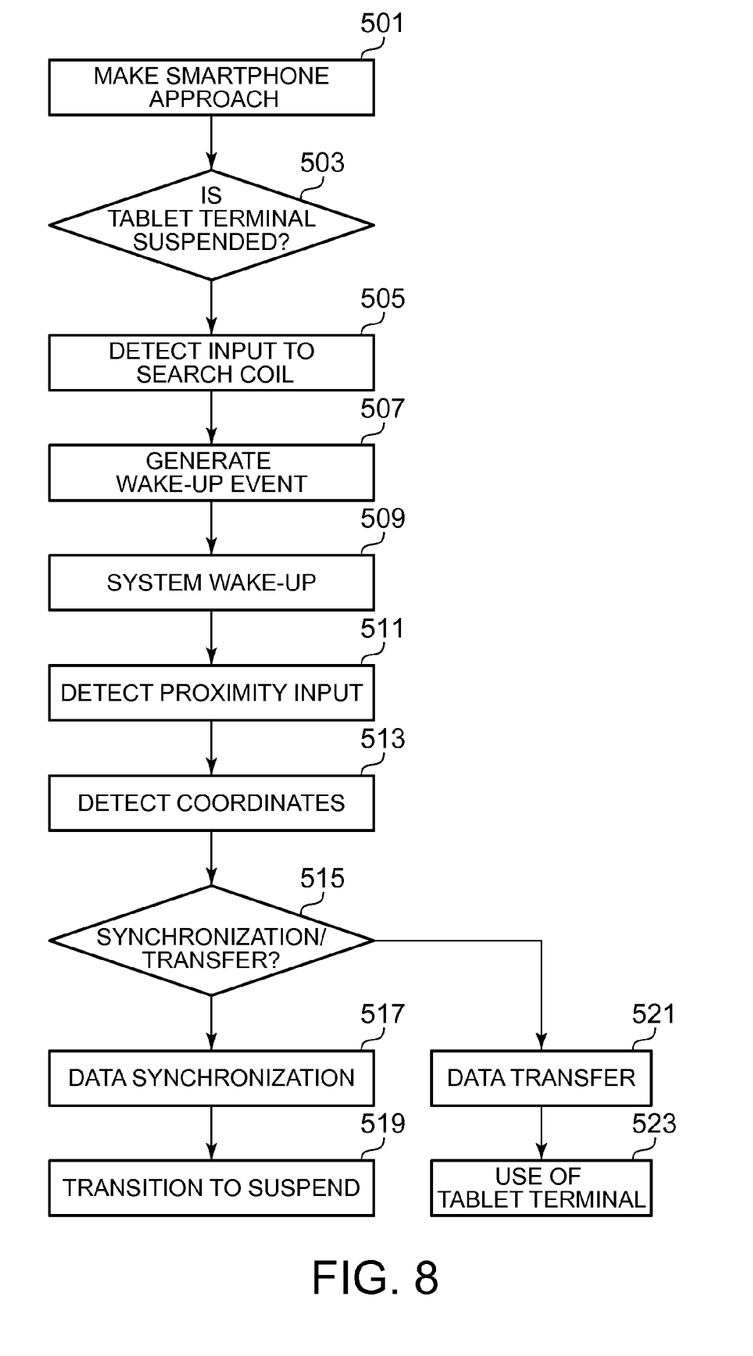
FIG. 8 is a flowchart diagram illustrating an operation procedure when data is transferred between the tablet terminal 51 and the smartphone 61.

FIG. 7 is a diagram for describing a state of synchronizing or transferring data between the tablet terminal 51 and the smartphone 61, and FIG. 8 is a flowchart showing the operation procedure. Such a scenario that data created or received by using the smartphone 61 on the go is transferred to the tablet terminal 51 in the office or synchronized with data updated on the tablet terminal 51 is assumed.

Coordinate domains 501 and 503 are defined for the digitizer panel 107 on the coordinates of the touch screen 53 of the tablet terminal 51. The coordinate domains 501 and 503 have almost the same size as the Smartphone 61 to overlap the Smartphone 61. In the SSDs 115 and 215, a docking application for processing data transfer is stored. The docking application on the tablet terminal 51 assigns data synchronization to the coordinate domain 501, and assigns data transfer to the coordinate domain 503. When the area of the touch screen 53 is large, the number of coordinate domains can be three or more.

The data synchronization means processing for replacing data on application programs pre-registered in the docking application with the latest data between the smartphone 61 and the tablet terminal 51. The data transfer means processing for transferring data on application programs pre-registered in the docking application from either one of the smartphone 61 and the tablet terminal 51 to the other. In block 501 of FIG. 8, the smartphone 61 in the power-on state is overlapped with the coordinate domain 501 or the coordinate domain 503 on the touch screen 53 in such a manner that the touch screen 63 faces the touch screen 53. The user selects a coordinate domain with which the smartphone 61 is overlapped to reflect a user's intention for either transfer or synchronization.

The smartphone 61 generates a control event in the procedure described with reference to FIG. 6 to run the docking application. The following shows the operation of the tablet terminal 51 from block 503 to block 515. In block 503, when the tablet terminal 51 is shifted to the suspend state, the procedure moves to block 505, while when it is shifted to the power-on state or the Connected Standby state, the procedure moves to block 511. In block 505, the wake-up circuit 169 detects the proximity of the smartphone 61 to generate a wake event, and in block 509, the tablet terminal 51 makes a transition to the power-on state.

In block 511, the controller 165 detects proximity input. In block 513, the controller 165 generates coordinate information. In block 515, the controller 165 determines in which of the coordinate domain 501 and the coordinate domain 503 the input coordinates corresponding to the input determined to be proximity input have been generated. When detecting proximity input to the coordinate domain 501, the controller 165 generates a synchronization event and sends it to the embedded system 100. The docking application on the embedded system 100 that has received the synchronization event prepares for synchronization, and sends a message indicative of the synchronization event to the smartphone 61 through the WPAN module 109 in block 517.

The docking application on the embedded system 200 that has received the message prepares for synchronization. After that, the synchronization of predetermined data is performed between the docking application on the embedded system 100 and the docking application on the embedded system 200. Upon completion of the synchronization, the procedure moves to block 519 in which the tablet terminal 51 makes a transition to the suspend state.

In block 515, when detecting proximity input to the coordinate domain 503, the controller 165 generates a transfer event and sends it to the embedded system 100. The docking application on the embedded system 100 prepares for data transfer, and sends a message indicative of the transfer event to the smartphone 61 through the WPAN module 109. The transfer of predetermined data from the smartphone 61 to the tablet terminal 51 is assumed here, but the direction of the transfer may be reversed.

The docking application on the embedded system 200 that has received the message prepares for data transfer. After that, the predetermined data is transferred from the Smartphone 61 to the tablet terminal 51 through the WPN module 209. As an example, the data to be transferred can be the URL of a web browser displayed on the smartphone 61. The tablet terminal 51 that has received the URL can display the same screen as that of the smartphone 61 in block 523. In this case, the same screen as that displayed on the smartphone 61 can be displayed on the large touch screen 53 of the tablet terminal 51 with simple operations.

Figure 9:
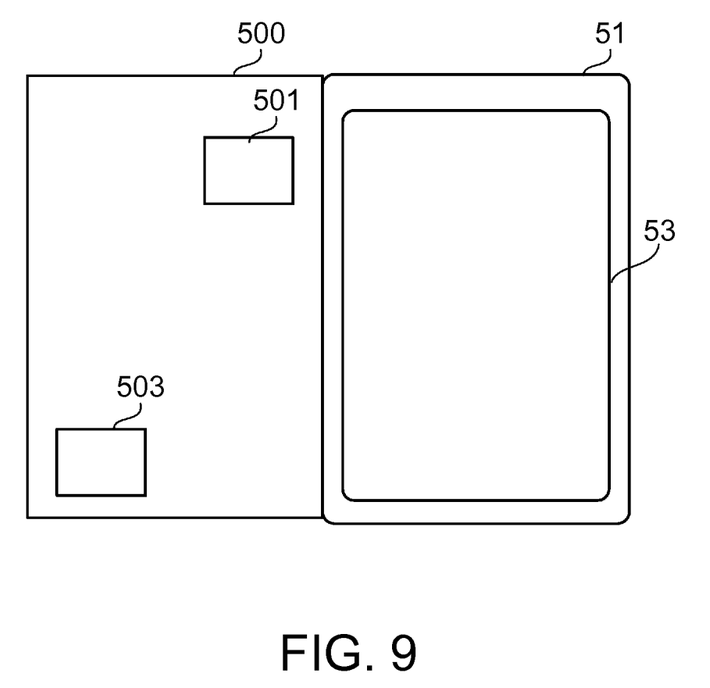
FIG. 9 is a block diagram illustrating a cover with coils attached thereto.

Although the procedure for generating a control event when digitizers approach each other has been described with reference to FIG. 6 and FIG. 8, the control event can also be generated when the touch screen is covered with a cover. FIG. 9 shows a state where loop coils 501 and 503 are attached to a cover 500 of the tablet terminal 51. When the surface of the touch screen 53 is covered with the cover 500 and electromagnetic wave interference between the loop coils 501 and 503 is detected, the digitizer panel 107 can determine proximity input and generate a close event. At this time, a predetermined control event can also be assigned to a pattern formed by providing two or more coordinate domains.

While the disclosed embodiments has been described so far with reference to the specific embodiment shown in the drawings, the disclosed embodiments are not limited to the embodiment shown in the drawings. It is needless to say that any known configuration can be employed as long as the configuration has the effects of the disclosed embodiments.

What is claimed is:

1. An apparatus comprising:
   an electronic device comprising a processor and equipped with at least two touch screen displays, each touch screen display comprising a coordinate input device digitizer for receiving input from an electronic pen, the touch screen displays configurable to face each other; and
   a memory of the electronic device that stores code executable by the processor, the code comprising:
      code that prepares a reference pattern for determining a type of input in the electronic device;
      code that detects input coordinates to a coordinate input device digitizer of one of the at least two touch screen displays by detecting an induced voltage across one or more sensor coils of the coordinate input device digitizer at predetermined time intervals;
      code that compares the reference pattern and the input coordinates, wherein an input coordinate pattern produced by the electronic pen on the coordinate input device digitizer is different than the input coordinate pattern produced on the coordinate input device digitizer when each of the at least two touch screen displays approach each other;
      code that transfers coordinate information to a system when determining that input of the input coordinates is generated by an operation of the electronic pen based on the comparison of the reference pattern and the input coordinates; and
      code that transfers a control event to the system when determining that the input of the input coordinates is generated by a cause other than the operation of the electronic pen based on the comparison of the reference pattern and the input coordinates, the cause other than the operation of the electronic pen comprising determining that each of the touch screen displays are approaching each other within a sensing proximity of each other.

2. The apparatus of claim 1, wherein the cause other than the operation of the electronic pen is caused by proximity of another coordinate input device digitizer to the coordinate input device digitizer.

3. The apparatus of claim 1, wherein the reference pattern is a pattern of temporal and spatial generation of the input coordinates.

4. The apparatus of claim 1, wherein the reference pattern includes pen pressure information on the input coordinates.

5. The apparatus of claim 1, wherein the code further comprises code that determines a coordinate domain of the coordinate input device digitizer in which the input is performed, and generating a different control event according to the coordinate domain.

6. The apparatus of claim 1, wherein the code further comprises code that shifts the electronic device to a sleep state according to the control event.

7. The apparatus of claim 1, wherein the code further comprises code that performs data synchronization or data transfer between the electronic device and another electronic device according to the control event.

8. The apparatus of claim 7, wherein the coordinate input device digitizer is one of a first and a second coordinate input device digitizer, the second coordinate input device allowing the first coordinate input device digitizer to approach and allowing input with an electronic pen, and wherein the first coordinate input device digitizer is mounted in a first tablet terminal, and the second coordinate input device digitizer is mounted in a second tablet terminal.

9. The apparatus of claim 8, wherein the first tablet terminal and the second tablet terminal are coupled openably/closably and attachably/detachably.

10. The apparatus of claim 8, wherein the system stops operating according to the control event.

11. The apparatus of claim 1, wherein the coordinate input device digitizer is one of a first coordinate input device and a second coordinate input device digitizer, the second coordinate input device for inputting with an electronic pen and allowing a first coordinate input device digitizer for inputting with an electronic pen to approach, the code further comprising:
    code that defines a first coordinate domain and a second coordinate domain for the second coordinate input device digitizer; and
    code that determines in which of the first coordinate domain and the second coordinate domain the input coordinates are generated; and
        wherein transferring the control event includes transferring a first control event when determining that input of the input coordinates is generated in the first coordinate domain or transferring a second control event when determining that the input of the input coordinates is generated in the second coordinate domain.

12. The apparatus of claim 11, wherein the code further comprises code that causes the electronic device shifted to a power-saving state to detect the proximity of the first coordinate input device digitizer to the second coordinate input device digitizer so as to wake up.

13. The apparatus of claim 12, wherein one of the first coordinate input device digitizer and the second coordinate input device digitizer is mounted in a smartphone.

14. A method comprising:
    preparing a reference pattern for determining a type of input for an electronic device comprising a processor and equipped with at least two touch screen displays, each touch screen display comprising a coordinate input device digitizer for receiving input from an electronic pen, the touch screen displays configurable to face each other;
    detecting input coordinates to a coordinate input device digitizer of the electronic device by detecting an induced voltage across one or more sensor coils of the coordinate input device at predetermined time intervals;
    comparing the reference pattern and an input coordinate pattern of the input coordinates, wherein an input coordinate pattern produced by the electronic pen on the coordinate input device digitizer of the electronic device is different than the input coordinate pattern produced on the coordinate input device digitizer when each of the touch screen displays approach each other; and
    generating a predetermined control event when determining that the input of the input coordinates is generated by a cause other than the operation of the electronic pen based on the comparison of the reference pattern and the input coordinates. pattern, the cause other than the operation of the electronic pen comprising determining that each of the touch screen displays are approaching each other within a sensing proximity of each other.

15. The method of claim 14, further comprising shifting the electronic device to a sleep state responsive to generating the predetermined control event.

16. The method of claim 14, further comprising stopping transfer of the coordinate information to the system responsive to generating the predetermined control event.

17. The method of claim 14, further comprising transferring predetermined data to another electronic device responsive to generating the predetermined control event.

18. The method of claim 14, further comprising transferring coordinate information to a system when determining that input of the input coordinates is generated by an operation of the electronic pen.

19. A system, comprising:
- at least two touch screen displays, each touch screen display comprising a coordinate input device digitizer for receiving input from an electronic pen, the touch screen displays configurable to face each other
- a plurality of coil arrays of a first coordinate input device digitizer of one of the at least two touch screen displays, each coil array composed of a plurality of coils;
- a transmitting circuit for supplying current to each coil;
- a receiving circuit for detecting induced voltage generated in the coil arrays;
- a selection circuit for connecting selected coil arrays to the transmitting circuit or the receiving circuit so that the selected coil arrays form a loop circuit by rotation;
- a nonvolatile memory storing a reference pattern for determining a type of input; and
- a processor and a memory that stores code executable by the processor, the code comprising:
    - code that receives the reference pattern for determining a type of input on the coordinate input device;
    - code that receives input coordinates detected on the first coordinate input device digitizer by detecting an induced voltage across the plurality of coils of the coordinate input device digitizer at predetermined time intervals;
    - code that compares the reference pattern and an input coordinate pattern of the input coordinates, wherein an input coordinate pattern produced by the electronic pen on the first coordinate input device digitizer is different than the input coordinate pattern produced on the first coordinate input device digitizer when each of the at least two touch screen displays approach each other;
    - code that transfers coordinate information to a system when determining that input of the input coordinates is generated by an operation of the electronic pen based on the comparison of the reference pattern and the input coordinates; and
    - code that transfers a control event to the system when determining that the input of the input coordinates is generated by a cause other than the operation of the electronic pen based on the comparison of the reference pattern and the input coordinate pattern, the cause other than the operation of the electronic pen comprising determining that each of the touch screen displays are approaching each other within a sensing proximity of each other.

20. The system of claim 19, further comprising a wake-up circuit that detects induced voltage across each coil when the electronic device is in a sleep state and generates a wake event for shifting the electronic device to a power-on state.

* * * * *